United States Patent [19]

Serini et al.

[11] 3,880,783

[45] Apr. 29, 1975

[54] TRANSPARENT MOULDING COMPOSITION OF A POLYCARBONATE AND A RESIN

[75] Inventors: Volker Serini, Krefeld; Gert Humme; Karl-Heinz Ott, both of Leverkusen; Wolfgang Cohnen, Krefeld-Uerdingen; Hugo Vernaleken, Krefeld-Bockum, all of Germany

[73] Assignee: Bayer Aktiengesellschaft, Leverkusen, Germany

[22] Filed: Dec. 3, 1973

[21] Appl. No.: 421,233

[30] Foreign Application Priority Data
June 9, 1973 Germany............................ 2329646

[52] U.S. Cl.................. 260/3; 260/47 XA; 260/873

[51] Int. Cl............................................. C08g 39/10
[58] Field of Search.................... 260/873, 47 XA, 3

[56] References Cited
UNITED STATES PATENTS

| | | | |
|---|---|---|---|
| 3,239,582 | 4/1962 | Keskkula et al. .................... | 260/873 |
| 3,642,946 | 2/1972 | Grabowski........................... | 260/873 |
| 3,663,471 | 5/1972 | Schirmer et al. .................... | 260/873 |
| 3,742,088 | 6/1973 | Holder et al......................... | 260/873 |

*Primary Examiner*—Melvin Goldstein
*Assistant Examiner*—E. A. Nielsen
*Attorney, Agent, or Firm*—Connolly and Hutz

[57] ABSTRACT

A transparent moulding composition comprising a bisphenol polycarbonate having a low refractive index due to a content of alkyl substitution and a rubber and/or a resin.

15 Claims, No Drawings

TRANSPARENT MOULDING COMPOSITION OF A POLYCARBONATE AND A RESIN

This invention relates to transparent moulding compounds comprising a. 10 – 95 % by weight of a transparent aromatic polycarbonate the linear chains of which consist to at least 50 % of recurrent structural units of formula (1)

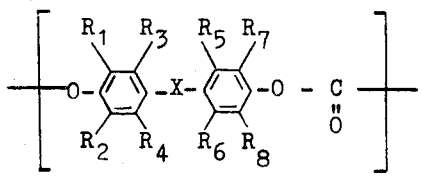

in which $R_{1-8}$ which may be the same or different represent hydrogen or $C_{1-5}$ alkyl and X may represent a single bond, $C_1$ to $C_{12}$ alkylene or alkylidene or

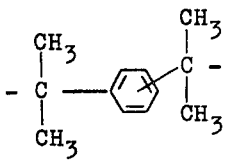

if at least one of the $R_{1-8}$ substituents is a $C_{1-5}$ alkyl or represents $C_{6-12}$ alkylene or alkylidene if $R_{1-8}$ is hydrogen and b. 5 – 90 % by weight of a rubber and/or a transparent resin which contains rubber, the difference in refractive indices between (a) and (b) being not more than 0.010.

In principle, the invention of these moulding compounds is based on the finding that the polycarbonates defined under (a) have very low refractive indices, so that the requirement of substantially equal refractive index with product (b) is met.

Polycarbonates containing recurrent units of formula (1) are known in the art. They have been described in, inter alia, "Polymer Reviews," Volume 9, Chemistry and Physics of Polycarbonates, by H. Schnell, Interscience Publisher, New York, 1964 and in German Offenlegungsschriften No. 2,063,050; 2,063,052 and 2,211,957 and in German Application No. P 22 10 604.3. They are basically prepared from bisphenols and phosgene in known manner. In addition to bisphenols which, when used in the synthesis of polycarbonates, yield products of formula (1), other bisphenols may also be used for the purpose of the invention to yield copolycarbonates, but these should contain at least 50% of units of formula (1).

Mixtures of polycarbonates which contain units of formula (1) and polycarbonates which do not contain any units of formula (1) are also suitable as constituent (a) of the moulding compounds provided the mixture as a whole contains at least 50 % of units of formula (1).

Polycarbonate units of formula (1) may be based on bisphenols such, for example, as the following:

1,1-Bis-(4-hydroxyphenyl)-hexane,
1,1-bis-(4-hydroxyphenyl)-heptane,
1,1-bis-(4-hydroxyphenyl)-octane,
1,1-bis-(4-hydroxyphenyl)-nonane,
1,1-bis-(4-hydroxyphenyl)-decane,
1,1-bis-(4-hydroxyphenyl)-undecane,
1,1-bis-(4-hydroxyphenyl)-dodecane,
2,2-bis-(4-hydroxyphenyl)-4-methylpentane,
2,2-bis-(4-hydroxyphenyl)-hexane,
2,2-bis-(4-hydroxyphenyl)-heptane,
2,2-bis-(4-hydroxyphenyl)-octane,
2,2-bis-(4-hydroxyphenyl)-nonane,
2,2-bis-(4-hydroxyphenyl)-decane,
2,2-bis-(4-hydroxyphenyl)-undecane,
2,2-bis-(4-hydroxyphenyl)-dodecane,
4,4-bis-(4-hydroxyphenyl)-hexane,
4,4-bis-(4-hydroxyphenyl)-heptane,
4,4-bis-(4-hydroxyphenyl)-octane,
4,4-bis-(4-hydroxyphenyl)-nonane,
4,4-bis-(4-hydroxyphenyl)-decane,
4,4-bis-(4-hydroxyphenyl)-undecane, 4,4-bis-(4-hydroxyphenyl)-dodecane,
1,1-bis-(2,5-dimethyl-4-hydroxyphenyl)-ethane,
1,1-bis-(2,5-dimethyl-4-hydroxyphenyl)-isobutane,
2,2-bis-(3-isopropyl-4-hydroxyphenyl)-propane,
2,2-bis-(3-isopropyl-4-hydroxyphenyl)-pentane,
4,4-bis-(3-isopropyl-4-hydroxyphenyl)-heptane,
α,α'-bis-(3-isopropyl-4-hydroxyphenyl)-p-diisopropylbenzene,
α,α'-bis-(3-isopropyl-4-hydroxyphenyl)-m-idisopropylbenzene,
bis-(3,5,-diethyl-4-hydroxyphenyl),
bis-(3,5-dimethyl-4-hydroxyphenyl)-methane,
1,1-bis-(3,5-dimethyl-4-hydroxyphenyl)-ethane,
1,1-bis-(3,5-dimethyl-4-hydroxyphenyl)-propane,
1,1-bis-(3,5-dimethyl-4-hydroxyphenyl)-heptane,
1,1-bis-(3,5-dimethyl-4-hydroxyphenyl)-dodecane,
2,2-bis-(3,5-dimethyl-4-hydroxyphenyl)-propane,
2,2-bis-(3,5-dimethyl-4-hydroxyphenyl)-butane,
2,2-bis-(3,5-dimethyl-4-hydroxyphenyl)-pentane,
2,2-bis-(3,5-dimethyl-4-hydroxyphenyl)-4-methylpentane,
2,4-bis-(3,5-dimethyl-4-hydroxyphenyl)-2-methylbutane,
2,4-bis-(3,5-dimethyl-4-hydroxyphenyl)-butane,
3,3-bis-(3,5-dimethyl-4-hydroxyphenyl)-pentane,
3,3-bis-(3,5-dimethyl-4-hydroxyphenyl)-hexane,
4,4-bis-(3,5-dimethyl-4-hydroxyphenyl)-heptane,
2,2-bis-(3,5-dimethyl-4-hydroxyphenyl)-octane,
2,2-bis-(3,5-dimethyl-4-hydroxyphenyl)-decane,
2,2-bis-(3,5-diethyl-4-hydroxyphenyl)-propane,
-bis-(3,5-diethyl-4-hydroxyphenyl)-methane,
2,2-bis-(3-methyl-5-propyl-4-hydroxyphenyl)-propane,
2,2-bis-(3,5-diethyl-4-hydroxyphenyl)-pentane,
4,4-bis-(3,5-diethyl-4-hydroxyphenyl)-heptane,
α,α'-bis-(3,5-dimethyl-4-hydroxyphenyl)-p-diisopropylbenzene,
α,α'-bis-(3,5-dimethyl-4-hydroxyphenyl)-m-diisopropylbenzene,
α,α'-bis-(3,5-diethyl-4-hydroxyphenyl)-p-diisopropylbenzene, and
α,α'-bis-(3,5-diethyl-4-hydroxyphenyl)-m-diisopropylbenzene.

Bisphenols which are carrying four alkyl substituents, i.e. in each of the o,o,o',o'-positions to the phenolic hydroxy groups are preferred, especially the following:
2,4-bis-(3,5-dimethyl-4-hydroxyphenyl)-2-methylbutane and 2,2-bis-(3,5-dimethyl-4-hydroxyphenyl)-propane.

The following are examples of bisphenols which when used in polycarbonate synthesis do not give rise to carbonate units of formula (1) but can be used for producing copolycarbonates or polycarbonates for the polycarbonate mixtures:

Hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxphenyl)-sulphones and
$\alpha,\alpha'$-bis-(hydroxyphenyl)-diisopropylbenzenes and the corresponding compounds which are alkylated or halogenated in the nucleus but do not give rise to carbonate units of formula (1). These and other suitable aromatic dihydroxy compounds have been described e.g. in U.S. Pat. Nos. 3,028,365; 2,999,835; 3,148,172; 3,271,368; 2,991,273; 3,271,367; 3,780,078; 3,014,891 and 2,999,846 and in German Offenlegungsschrift No. 1,570,603.

The following are particularly preferred:
Bis-(4-hydroxyphenyl)-methane,
2,2-bis-(4-hydroxyphenyl)-propane,
2,2-bis-(3,5-dichloro-4-hydroxyphenyl)-propane,
2,2-bis-(3,5-dibromo-4-hydroxyphenyl)-propane and
$\alpha,\alpha'$-bis-(4-hydroxyphenyl)-p-diisopropylbenzene.

The polycarbonates may, of course, be branched by incorporating small quantities of polyhydroxyl compounds, e.g. 0.05 to 2.0 mols percent (based on the quantity of bisphenols). Polycarbonates of this kind have been described, e.g. in German Offenlegungsschriften No. 1,570,533; 2,116,974 and 2,113,347, in British Patents No. 885,442 and 1,079,821 and in U.S. Pat. No. 3,544,514. The following are some of the polyhydroxyl compounds which are suitable for this purpose: Phloroglucinol, 4,6-dimethyl-2,4,6-tri-(4-hydroxyphenyl)-heptene-(2), 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl-methane, 2,2--bis-[4,4-(4,4'-dihydroxydiphenyl)-cyclohexyl]-propane, 2,4-bis-(4-hydroxyphenyl-4-isopropyl)-phenol, 2,6-bis-(2'-hydroxy-5'-methyl-benzyl)-4-methylphenol, 2,4-dihydroxybenzoic acid, 2-(4-hydroxyphenyl)-2-(2,4-dihydroxyphenyl)-propane and 1,4-bis-(4',40''-dihydroxytriphenyl-methyl)-benzene.

Most of the polycarbonates have molecular weights $\overline{M}_w$ (weight average) of 10,000 to over 200,000, preferably 20,000 to 60,000.

The rubbers for the purpose of this invention may be, for example, polyurethane rubbers ethylene/vinyl acetate rubbers, silicone rubbers polyether rubbers, polyalkenamer rubbers, ethylene/propylene/diene rubbers and so-called diene rubbers, i.e. hompolymers of conjugated dienes which contain from 4 to 8 carbon atoms such as butadiene, isoprene, piperylene and chloroprene, copolymers of such dienes with each other and copolymers of such dienes with other compounds, e.g. with styrene, acrylic or methacrylic compounds (e.g. acrylonitrile, methacrylonitrile, acrylic acid, methacrylic acid, butyl acrylate or methylmethacrylate) or isobutylene. Rubbers which have a refractive index of $n_D^{20} > 1.50$ are preferred, e.g. polybutadiene and polyisoprene, copolymers of butadiene and isoprene with styrene and acrylonitrile, and transpolypentenamers.

Transparent resins which contain rubber within the meaning of this invention are either transparent graft polymers into which rubber may have been mixed; transparent mixtures of graft polymers, thermoplastic resins to which rubber may be added or transparent mixtures of thermoplastic resins and rubber.

The total rubber content of the transparent moulding compounds according to the invention is preferably 5 to 40% by weight. It is composed of rubber which has not been grafted and which has been mixed into the transparent moulding compounds and rubber which serves as graft stock for the transparent graft polymers in the mixture.

Transparent graft polymers for the purpose of this invention may be obtained by grafting monomers on rubber.

The monomers used may be styrene and its derivatives, e.g. $\alpha$-methylstyrene, $\alpha$-chlorostyrene, p-chlorostyrene, 2,4-dichlorostyrene, p-methylstyrene, 3,4-dimethylstyrene, o- and p-divinylbenzene, p-methyl-$\alpha$-methylstyrene and p-chloro-$\alpha$-methylstyrene, and acrylic and methyacrylic compounds, e.g. acrylic and methacrylic acid, acrylonitrile, methacrylonitrile, methylacrylate, ethylacrylate, n-propyl and isopropyl acrylate, n-butyl and isobutylacrylate, 2-ethylhexylacrylate, methylmethacrylate, ethylmethacrylate, n-propyl and isopropylmethacrylate, n-butyl and isobutyl methacrylate, cyclohexylmethacrylate and isobornyl methacrylate and to which maleic acid anhydride may also be added. Maleic acid anhydride may be used in all cases as additional monomer but not on its own.

The preferred monomers are styrene, $\alpha$-methylstyrene, acrylonitrile, methacrylonitrile, and methyl and ethyl acrylates and methacrylates. These monomers, as well as the other monomers, may be used alone or mixed with other monomers.

The above mentioned rubbers, for example, may be used as graft stock for producing the transparent graft polymers. Those rubbers which have been mentioned as preferred in the above list are also preferred for this purpose, Thermoplastic resins is the term used here for those polymers which can be obtained by polymerisation of one or copolymerisation of several of the above mentioned monomers which can also be used for grafting. Here again, those mentioned as preferred monomers are also preferred for this purpose.

The rubbers, thermoplastic resins and graft polymers can be prepared by known methods of radical polymerisation, e.g. by bulk polymerisation or polymerisation in solution, suspension or emulsion or by combined process such as precipitation and bulk-/suspension processes. Polymerisation processes carried out with the aid of organometallic mixed catalysts (Ziegler-Natta catalysts) are also known.

The polymer mixtures of this invention may be prepared by various methods. The polymers used as starting materials may all be dissolved together in a solvent or solvent mixture. The polymer mixture can be obtained by precipitating all the polymers together by the addition of a non-solvent or by introducing the solution of polymers dropwise into a precipitating agent or by removal of the solvent by evaporation.

If desired, some polymers may be misxd separately before all the components of the composition are finally mixed. Thus, for example, latices of a resinous copolymer (e.g. styrene/acrylonitrile copolymer) and of a rubber (e.g. butadiene/acrylonitrile copolymer) may be mixed by joint precipitation before they are blended with the polycarbonate to form the final moulding compound.

The polymers used as starting materials may also be mixed in the form of solvent-free melts in mixing apparatus such as extruders, internal kneaders or mixing rollers. Mixing may also be achieved by preparing some polymers which are constituents of the mixture in the presence of other polymers, and this may be carried out in such a way that the first mentioned polymers are at least partly grafted on the high molecular weight polymers in whose presence they are prepared. Thus, for example, styrene may be polymerised by radical polymerisation in the presence of polycarbonate and polybutadiene. This polymerisation may be carried out by various known methods (solution, bead, emulsion or block polymerisation).

The rubber component generally forms a separate phase which is distributed in the polymer matrix. The rubber may be in the form of individual globlets or several globlets agglomerated together or in the form of other regular or irregular particles or conglomerates or particles or also in the form of a network in which other polymers may be embedded. The particle diameter is generally 0.01 – 20 $\mu$m, preferably 0.06 – 10 $\mu$m. The particles may be of one or of more types differing substantially from each other in shape, size and size distribution depending on the method of preparation of the polymer mixture and the choice of its components. Due to differences in the physical make up of the rubber phases, polymer mixtures which contain the same rubber component and also have otherwise the same composition may yet differ from each other intheir properties, e.g. their toughness, weld line strength and surface gloss. Thus, for example, the surface gloss of injection mouldings is better if the rubber particles are very small than if they are coarse and, conversely, both toughness and weld line strength are greater in the case of coarser rubber particles than in the case of small particles.

Particularly high weld line strength in observed with rubber particles very irregular in size and shape, as, for example, in polymer mixtures containing non-grafted rubber. Very high weld line strength is also obtained if the rubber component is a graft polymer having particle sizes of 0.8 to 10 $\mu$, e.g. graft made by bulk/suspension polymerisation (network structure). Rubber distributed in the form of agglomerates, e.g. agglomerates of very small rubber globlets is also advantageous as it provides for excellent weld line strength and high gloss, provided the agglomerate particle size does not exceed a certain limit.

Total rubber content is also influencing the properties of the polymer mixtures. If two mixtures contain rubber distributed in substantially the same form, toughness and weld line strength increase with increasing rubber content while the modulus of elasticity decreases.

While the rubber component generally forms a separate phase in the polymer mixtures of this invention, the other polymer components of the mixture may form a common phase in which the various polymers are distributed practically in molecular dispersion, or they may form several phases each of which may consist of a mixture of various polymers in practically molecular dispersion.

In order to obtain transparent moulding compounds the rubbers and rubber modified transparent thermoplastic resins must have a refractive index not differing too much from the refractive index of the polycarbonate used; the two refractive indices should generally differ by not more than 0.010 units from each other to guarantee transparency. A moulding compound is defined as being transparent when a layer 1 mm in thickness has a total scattered light transmission T$\rho$ (according to DIN 5036 and DIN 4646) of at least 50. Compounds of which layers 4 mm in thickness have a T$\rho$ of at least 50 are preferred. Those which have T$\rho$ values above 70 in layers 4 mm in thickness are particularly preferred.

Transparent polycarbonate based moulding compounds of the described type have not been described before. Known polymer mixtures of polycarbonates based on bisphenol A and ABS polymers or butadiene/styrene polymers (high impact polystyrene) (see German Pat. No. 1,109,884 and 1,170,141) are not transparent.

Transparent ABS and BS graft polymers are also known but their alloys with bisphenol A based polycarbonate are not transparent because the refractive indices are very different from each other. One well known condition for transparency of polyphasic polymer mixtures such as those mentioned above is substantial equality of the refractive indices of the polymer constituents. It is known to the art that polycarbonates have very high refractive indices as far as transparent thermoplastic resins are concerned. Polycarbonates previously investigated were found to have refractive indices of $n_D^{25}$ = 1.56 to 1.65 (see Kunststoff-Handbuch 1972, Carl hauser Verlag, Munich, Volume VIII). For this reason, it has up to now appeared impossible to produce usable transparent mixtures of polycarbonates and ABS or butadiene/styrene graft polymers. It has now been established that polycarbonates produced from certain bisphenols have extremely low refractive indices, more specifically that refractive indices, can be even below $n_D^{20}$ = 1.56 if the bisphenols contain a high proportion of aliphatic carbon atoms. Another surprising finding was that the refractive indices are especially low in polycarbonates obtained from o,o,o',o'-tetraalkyl substituted bisphenols. Though transparent polymer alloys could, e.g. be obtained from such low refractive index polycarbonates and ABC graft polymers or butadiene/styrene graft polymers by adjusting them to a practically identical refractive index. Alloys which contain polycarbonates based on o,o,o',o'-tetraalkyl substituted bisphenols are particularly remarkable because they are not only highly transparent but also have high softening temperatures and excellent stability to saponification by aqueous alkalies and acids. Compared with the non-transparent mixtures of bisphenol-A-polycarbonates previously known, they have improved compatibility (reflected e.g. in higher yield points $\sigma_s$ in their stress-strain diagram and astonishingly high weld line strength) and higher moduli of elasticity. They also have high impact strength and notched impact strength and high tracking resistane, are easily processed, have high structural viscosity and low susceptibility to stress crackling. The compositions found constitute a new class of transparent synthetic resins with a unique combination of properties not found in other transparent synthetic resins such as polystyrene, polymethylmethacrylate, polyvinyl chloride, transparent ABS and transparent polyamide, polycarbonate and polysulphone.

EXAMPLE 1

Preparation of the polycarbonate component

The polycarbonates shown in the Table were obtained from phosgene and the given bisphenols by interfacial polycondensation, using phenols as chain limiting agents, e.g. as described in polymer reviews, Volume 9, Chemistry and Physics of Polycarbonates by H. Schnell, Interscience Publishers, New York, 1964 and in German Offenlegungsschriften No. 2,063,050 and 2,211,957 and in German Pat. Applications No. P 22 48 817.1 and P 22 04 380.7

Table

| Example | Polycarbonate | Polycarbonates Ratio of constituents | $\overline{M}_w$ | $n_D^{20}$ |
|---|---|---|---|---|
| a | TMBPA-PC | — | 31,000 | 1.546 |
| b | TMBPJ-PC | — | 32,000 | 1.543 |
| c | TMBPA-PC/BPA-PC-mixture | 70/20 parts by weight | +30,000 | 1.554 |
| d | TMBPJ/BPA-CPC | 75/25 molar parts | 30,000 | 1.556 |
| e | TMBPA-TCBPA-CPC | 83/17 molar parts | 31,000 | 1.553 |

PC = polycarbonate
CPC = copolycarbonate
TMBPA = 2,2-bis-(3,5-dimethyl-4-hydroxyphenyl)-propane
TMBPJ = 2,4-bis-(3,5-dimethyl-4-hydroxyphenyl)-2-methyl-butane
BPA = 2,2-bis-(4-hydroxyphenyl)-propane
TCBPA = 2,2-bis-(3,5-dichloro-4-hydroxyphenyl)-propane
+ = molecular weight of BPA-PC (molecular weight of TMBPA-PC as in Example 1 a)
$\overline{M}_w$ = molecular weight (weight average)
$n_D^{20}$ = refractive index at 20°C

EXAMPLE 2

Preparation of grafting bases

A solution of
$w$ parts by weight of salt-free water,
$e$ parts by weight of the sodium salt of disproportionated abietic acid and
$p$ parts by weight of potassium persulphate
are introduced into a pressure resistant vessel equipped with a stirrer. The air is displaced by introducing nitrogen and the internal temperature of the vessel is adjusted to approximately 60°C.

$r$ parts by weight of dodecylmercaptan are added, followed by $b$ parts by weight of butadiene and $s$ parts by weight of styrene.

After termination of polymerisation, small quantities of unreacted butadiene are removed by stirring the latex under reduced pressure. Details of individual runs are tabulated in Table 2.

Table 2

| Run No. | w | e | p | r | b | s | Solids content (%) | $d$ [2] | $n_D^{20}$ |
|---|---|---|---|---|---|---|---|---|---|
| 1 | 180 | 3.5 | 0.3 | 0.2 | 100 | — | 36.9 | 0.09 | 1.519 |
| 2 | 200 | 3.5 | 0.3 | 0.2 | 65 | 35 | 32.9 | 0.07 | 1.544 |
| 3 | 200 | 3.5 | 0.3 | 0.2 | 45 | 55 | 33.0 | 0.06 | 1.557 |
| 4 | 150 | 3.5 | 0.3 | 0.2 | 70 | 30 | 39.7 | 0.07 | 1.540 |
| 5 | 80 | 1.5 [1] | 0.3 | 0.35 | 100 | — | 56.1 | 0.39 | 1.519 |

[1] 0.5 parts were introduced at the beginning of polymerisation and further 1.0 parts were added in the course of polymerisation
[2] $d$ = average diameter of latex particles [μm]

EXAMPLE 3

Preparation of graft polymers

The rubber latices of Example 2 were diluted with demineralised water so that they contained $g$ parts by weight of rubber per
175 parts by weight of water.

0.5 parts by weight of potassium persulphate were added to the water used for diluting the latex. The air was displaced by nitrogen and the reaction mixture heated to 65°C.

2.0 parts by weight of alkylsulphate, dissolved in 25 parts by weight of demineralised water and the total monomer charge tabulated in Table 2 (styrene, methyl methacrylate and acrylonitrile)
per $g$ parts by weight of rubber were introduced through separate inlets within about 4 hours. Stirring was continued for further 2 hours at 65°C to complete the reaction.

The resulting graft polymer latex was coagulated with 2 % of magnesium sulphate solution, the coagulate separated, washed free from salt and dried under vacuum at 70 to 80°C.

Table 3

| Run No. | Grafting base = latex from Example 2 Run No. | g-Parts by weight of rubber | Parts by weight of styrene | Parts by weight of methyl methacrylate | Parts by weight of acrylonitrile | refractive index $n_D^{20}$ |
|---|---|---|---|---|---|---|
| 6 | 1 | 65 | 35 | — | — | 1.544 |
| 7 | 5 | 48 | 52 | — | — | 1.555 |
| 8 | 1 | 55 | 33 | — | 12 | 1.542 |
| 9 | 5 | 30 | 52 | — | 18 | 1.555 |
| 10 | 1 | 34.3 | 39.3 | 11.2 | 15.2 | 1.544 |
| 11 | 4 | 94 | 6 | — | — | 1.543 |
| 12 | 4 | 65 | 35 | — | — | 1.554 |
| 13 | 4 | 84 | 11 | — | 5 | 1.545 |
| 14 | 4 | 42 | 42 | — | 16 | 1.557 |
| 15 | 4 | 60 | 19.6 | 15.4 | 5.0 | 1.542 |
| 16 | 4 | 20.5 | 50.5 | 9.5 | 19.5 | 1.556 |

EXAMPLE 4

Preparation of thermoplastic copolymers 0.35 parts by weight of potassium persulphate and 0.2 parts by weight of alkyl sulphate are dissolved in 125 parts by weight of demineralised water.

The aqueous solution is heated to 65°C and the air is displaced with nitrogen. An emulsifier solution of 25 parts by weight of demineralised water and
1.2 parts by weight of the sodium salt of a disproportionated resinic acid
and a monomer mixture of the composition shown in Table 3
are added through two separate inlets over a period of about 4 hours.

Stirring is continued for further 2 hours at 65°C to complete the reaction. The resulting copolymer latex is coagulated with 2 % magnesium sulphate solution, the coagulate is separated off, washed free from salt and dried under vacuum at 70° to 80°C.

Table 4

| Run No. | Parts by weight of styrene | Parts by weight of methyl methacrylate | Parts by weight of acrylonitrile | Parts by weight of tertiary dodecyl-mercaptan | refractive index $n_D^{20}$ |
|---|---|---|---|---|---|
| 17 | 53 | 47 | — | 0.2 | 1.546 |
| 18 | 67 | 33 | — | 0.2 | 1.558 |
| 19 | 47.6 | 40.6 | 11.8 | 0.2 | 1.543 |
| 20 | 60 | 15 | 25 | 0.2 | 1.557 |

The polycarbonates, rubbers graft polymers and thermoplastic copolymers of the mixtures in Examples 5 to 9 are described in Examples 1 to 4. The polycarbonate and the other polymer components were mixed in a double screw extruder at 220° to 260°C. The polymer strand delivered from the extruder was cooled and granulated.

EXAMPLE 5

Mixture of TMBPA-PC and TMBPJ-PC with various graft polymers.

TMBPA- and TMBPJ-polycarbonate from Examples 1a and 1b were mixed with various graft polymers from Example 3 in weight ratios of 50 : 50 and 60 : 40, respectively, via their solvent-free melts.

Table 5

| Example 5 Run No. | TMBPA-PC $n_D^{20} = 1.546$ (parts by weight) | TMBPJ-PC $n_D^{20} = 1.543$ (parts by weight) | Graft polymer from Example 3 Run No. | Parts by weight | refractive index $n_D^{20}$ of graft polymer | Transparent mixture |
|---|---|---|---|---|---|---|
| a | 60 | — | 6 | 40 | 1.544 | yes |
| b | 60 | — | 10 | 40 | 1.544 | " |
| c | 50 | — | 13 | 50 | 1.545 | " |
| d | 60 | — | 8 | 40 | 1.542 | " |
| e | — | 50 | 8 | 50 | 1.542 | " |
| f | — | 50 | 11 | 50 | 1.543 | " |
| g | — | 60 | 15 | 40 | 1.543 | " |

EXAMPLE 6

Mixtures of copolycarbonates and polycarbonate mixtures with various graft polymers The TMBPA-PC/BPA-polcarbonate mixture from Example 1c and the TMBPJ/BPA- and TMBPA/TCBPA-copolycarbonates from Examples 1d and 1e were mixed with various graft polymers from Example 3 in weight ratios of 50 : 50, via their solvent-free melts.

Table 6

| Example 6 Run No. | TMBPA-PC/BPA-PC-mixture $n_D^{20} = 1.554$ (parts by weight) | TMBPJ/BPA-CPC $n_D^{20} = 1.556$ (parts by weight) | TMBPA/TCBPA-CPC $n_D^{20} = 1.553$ (parts by weight) | Graft polymer from Example 3 Run No. | Parts by wt. | $n_D^{20}$ | Transparent mixture |
|---|---|---|---|---|---|---|---|
| a | 50 | — | — | 7 | 50 | 1.555 | yes |
| b | 50 | — | — | 16 | 50 | 1.556 | " |
| c | — | 60 | — | 9 | 40 | 1.555 | " |
| d | — | 50 | — | 14 | 50 | 1.557 | " |
| e | — | — | 50 | 12 | 50 | 1.554 | " |

EXAMPLE 7

Mixtures of polycarbonates and graft polymers in various proportions

TMBPA- and TMBPJ-polycarbonate and TMBPA/BPA-copolycarbonate from Examples 1a, 1b and 1d were mixed with various graft polymers from Example 3 in various weight ratios, namely 70 : 30, 50 : 50 and 40 : 60 via their solvent-free melt.

Table 7

| Example 7 Run No. | Polycarbonate | $n_D^{20}$ poly-carbonate | Graft polymer from Example 3 Run No. | $n_D^{20}$ graft polymer | Transparent mixture |
|---|---|---|---|---|---|
| a | TMBPA-PC | 1.546 | 6 | 1.544 | yes |
| b | TMBPJ-PC | 1.543 | 15 | 1.543 | " |
| c | TMBPJ/BPA-CPC | 1.556 | 9 | 1.555 | " |

EXAMPLE 8

Mixtures of polycarbonates with rubbers and thermoplastic copolymers

TMBPA- and TMBPJ-polycarbonate and TMBPA/BPA-copolycarbonate from Examples 1a, 1b and 1c were mixed with mixtures of various rubbers from Examples 2 and thermoplastic resins from Example 4, via the solvent-free melts. For details see Table 8.

EXAMPLE 9

Mixtures of polycarbonates graft polymers and thermoplastic copolymers

TMBPJ-polycarbonate from Examples 1b and TMBPA-PC/BPA-PC mixture from Example 1c were mixed with mixtures of graft polymers from Example 3 and thermoplastic copolymers from Example 4, via the solvent-free melts. For details see Table 9.

EXAMPLE 10

Some properties of transparent TMBPA-polycarbonate/graft polymer mixtures of this invention compared with those of BPA-polycarbonate/graft polymer mixtures The polymer mixtures shown in the Table were prepared from the solvent-free melts as already described above.

Table 8

| Example 8 Run No. | Polycarbonate Type | $n_D^{20}$ | Rubber Run No. | $n_D^{20}$ | Thermoplastic copolymer Example 4 Run No. | $n_D^{20}$ | Total mixture PC/rubber/thermoplastic copolymer Parts by weight | Transparency |
|---|---|---|---|---|---|---|---|---|
| a | TMBPA-PC | 1.546 | 2 | 1.544 | 17 | 1.544 | 40/20/40 | yes |
| b | TMBPJ-PC | 1.543 | 2 | 1.544 | 19 | 1.543 | 40/20/40 | " |
| c | TMBPJ/BPA-CPC | 1.556 | 3 | 1.557 | 18 | 1.558 | 40/20/40 | " |
| d | TMBPJ/BPA-CPC | 1.556 | 3 | 1.557 | 20 | 1.557 | 40/20/40 | " |

Table 9

| Example 9 Run No. | Polycarbonate Type | $n_D^{20}$ | Graft polymer Example 3 Run No. | $n_D^{20}$ | Thermoplastic copolymer Example 4 Run No. | $n_D^{20}$ | Total mixture PC/rubber/thermoplastic copolymer (parts by wt.) | Transparency |
|---|---|---|---|---|---|---|---|---|
| a | TMBPJ-PC | 1.543 | 10 | 1.544 | 19 | 1.543 | 40/40/20 | yes |
| b | TMBPA-PC/BPA-PC mixture | 1.554 | 12 | 1.554 | 18 | 1.558 | 50/30/20 | " |

Table 10

| Example 10 Run No. | PC/graft polymer mixture | % by weight rubber in mixture | % by weight polycarbonate in mixture | CSS (cmkp/cm²) | E-modulus (kp/cm²) | Vicat A(°C) | yield point $\sigma_s$ (kp/cm²) | Saponification stability | Transparency |
|---|---|---|---|---|---|---|---|---|---|
| a | from Ex. 5a TMBPA-PC/graft polymer | 26 | 60 | 11 | 15,000 | 171 | 480 | a | h |
| b | from Ex. 5d TMBPA-PC/graft polymer | 22 | 60 | 9 | 16,500 | 178 | 520 | a | h |
| c | BPA-PC/graft polymer mixture, graft polymer as in Example 5a | 26 | 60 | 5 | 13,000 | 135 | 390 | d | o |

Table 10—Continued

| Example 10 Run No. | PC/graft polymer mixture | % by weight rubber in mixture | % by weight polycarbonate in mixture | CSS (cmkp/cm²) | E-modulus (kp/cm²) | Vicat A(°C) | yield point $\sigma_s$ (kp/cm²) | Saponification stability | Transparency |
|---|---|---|---|---|---|---|---|---|---|
| d | BPA-PC/graft polymer mixture, graft polymer as in Example 5d | 22 | 60 | 9 | 14,600 | 138 | 410 | d | c |

Legend:
Column 2: Mixtures Example 10c and Example 10d are comparison mixtures for comparison with mixtures Example 10a and Example 10b.
Column 5: CSS = weld line strength, determined as follows: A small standard test bar is injection moulded by introducing polymer melt from both ends of the mould so that a weld line is formed in the middle of the bar; impact strength is then determined in accordance with DIN 53 453.
Columns 6, 7 and 8: The E-modulus, heat distortion (Vicat A) and yield point ($\sigma_s$) of the stress-strain diagram were determined according to DIN 53 455, DIN 53 460/A and DIN 53 453 respectively.
Column 9: The saponification stability was tested by immersion for 100 hours in boiling 20 % aqueous NaOH and for 500 hours in concentrated ammonia solution at 25°C. The results were approximately the same in both media. $a$ = almost unchanged, $d$ = substantially destroyed.
Column 10: $h$ = highly transparent, $o$ = opaque
The CSS of the TMBPA-PC used is 13 cmkp/cm² and that of the BPA-PC is 110 cmkp/cm².

We claim:
1. A transparent moulding compound which comprises
   a. 10 to 95 % by weight of a transparent aromatic polycarbonate the linear chains of which consist to at least 50 % of recurrent structural units of formula (1)

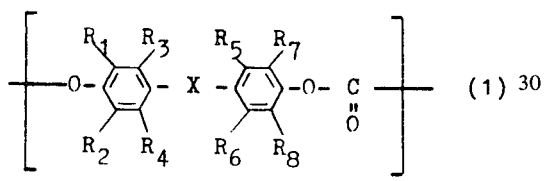

in which $R_1$ to $R_8$, which may be the same or different, represent hydrogen or alkyl and X represents a single bond, a $C_1$ to $C_{12}$ alkylene or alkylidene group or

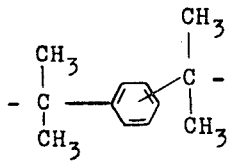

if at least one of the $R_1$ to $R_8$ substituents is an alkyl group or represents a $C_6$ to $C_{12}$ alkylene or alkylidene group if $R_1$ to $R_8$ is hydrogen
and
   b. 5 to 90 % by weight of a transparent rubber and/or a transparent resin which contains rubber, the difference in refractive indices between (a) and (b) being not more than 0.010.

2. A moulding compound as claimed in claim 1 in which, in the general formula (1) of claim 1, $R_1$ to $R_8$ represents hydrogen or a $C_1$ to $C_5$ alkyl group.

3. A moulding compound as claimed in claim 1, in which in the general formula (1), $R_1$, $R_2$, $R_7$ and $R_8$ represent $C_1 - C_3$ alkyl, $R_3$, $R_4$, $R_5$ and $R_6$ represent H, and X represents $C_1 - C_{12}$ alkylene or alkylidene.

4. A moulding compound as claimed in claim 1, in which the structural units of the formula (1) are based on 2,4-bis-(3,5-dimethyl-4-hydroxyphenyl)-2-methylbutane or 2,2-bis-(3,5-dimethyl-4-hydroxyphenyl)-propane.

5. A moulding compound as claimed in claim 1, in which the polycarbonate (a) contains up to 50 % of structural units based on bis-(4-hydroxyphenyl)-methane; 2,2-bis-(4-hydroxyphenyl)-propane; 2,2-bis-(3,5-dibromo-4-hydroxyphenyl)-propane or $\alpha,\alpha'$-bis-(4-hydroxyphenyl)-p.diisopropylbenzene.

6. A moulding compound as claimed in claim 1, in which the polycarbonate (a) is branched by the incorporation of small quantities of polyhydroxyl compound.

7. A moulding compound as claimed in claim 6 in which the polycarbonate contains from 0.05 to 2.0 mols percent of polyhydroxyl compound.

8. A moulding compound as claimed in claim 1, in which the polycarbonate (a) has a molecular weight of from 10,000 to 200,00.

9. A moulding compound as claimed in claim 8, in which the polycarbonate (a) has a molecular weight of from 20,000 to 60,000.

10. A moulding compound as claimed in claim 1, in which the rubber (b) has a refractive index of $n_D^{20} > 1.50$.

11. A moulding compound as claimed in claim 1, in which the rubber is polybutadiene, polyisoprene, a copolymer of butadiene or isoprene with styrene and/or acrylonitrile or a transpolypentenamer.

12. A moulding compound as claimed in claim 1, in which the component (b) is a transparent graft polymer into which rubber has been mixed, a transparent mixture of a graft polymer, a thermoplastic resin and rubber or a transparent mixture of a thermoplastic resin and rubber, said thermoplastic resin being a homopolymer or copolymer of styrene, $\alpha$-methylstyrene, acrylonitrile, methacrylonitrile, methylacrylate, methylmethacrylate, ethylacrylate or ethylmethacrylate.

13. A moulding compound as claimed in claim 1, in which the component (b) is a transparent graft polymer or transparent mixture of a graft polymer and a thermoplastic resin, said thermoplastic resin being a homopolymer or copolymer of styrene, $\alpha$-methylstyrene, acrylonitrile, methacrylonitrile, methylacrylate, methylmethacrylate, ethylacrylate or ethylmethacrylate.

14. A moulding compound as claimed in claim 1, in which the total rubber content is between 5 and 40 % by weight.

15. A moulding compound as claimed in claim 12 in which the graft polymer is obtained by grafting one or several of the monomers styrene, $\alpha$-methylstyrene, acrylonitrile, methacrylonitrile, methylacrylate, methylacrylate, ethylacrylate and ethylmethacrylate onto a diene rubber.

* * * * *